US011736969B2

(12) United States Patent
Qin et al.

(10) Patent No.: US 11,736,969 B2
(45) Date of Patent: Aug. 22, 2023

(54) MICRO-POWER WIRELESS ACCESS METHOD AND APPARATUS FOR INTERNET OF THINGS FOR POWER TRANSMISSION AND TRANSFORMATION EQUIPMENT

(71) Applicants: State Grid Jiangsu Electric Power Co., Ltd. Research Institute, Jiangsu (CN); Shanghai Institute of Microsystem and Information Technology, Chinese Academy of Sciences, Shanghai (CN); State Grid Jiangsu Electric Power Co., Ltd., Jiangsu (CN); State Grid Corporation of China, Beijing (CN)

(72) Inventors: Jianhua Qin, Jiangsu (CN); Yongling Lu, Jiangsu (CN); Hong Liu, Shanghai (CN); Chengbo Hu, Jiangsu (CN); Zhen Wang, Jiangsu (CN); Chao Yun, Shanghai (CN); Min Zheng, Shanghai (CN); Jun Jia, Jiangsu (CN); Guojiang Zhang, Jiangsu (CN); Lingling Xu, Jiangsu (CN); Fengbo Tao, Jiangsu (CN); Qiang Huang, Jiangsu (CN); Ziquan Liu, Jiangsu (CN); Xueqiong Zhu, Jiangsu (CN); Chong Tan, Shanghai (CN)

(73) Assignees: State Grid Jiangsu Electric Power Co., Ltd. Research Institute, Nanjing (CN); Shanghai Institute of Microsystem and Information Technology, Chinese Academy of Sciences, Shanghai (CN); State Grid Jiangsu Electric Power Co., Ltd., Nanjing (CN); State Grid Corporation of China, Beijing (CN)

( * ) Notice: Subject to any disclaimer, the term of this patent is extended or adjusted under 35 U.S.C. 154(b) by 113 days.

(21) Appl. No.: 17/621,247

(22) PCT Filed: Nov. 3, 2021

(86) PCT No.: PCT/CN2021/128290
§ 371 (c)(1),
(2) Date: Dec. 21, 2021

(87) PCT Pub. No.: WO2022/095863
PCT Pub. Date: May 12, 2022

(65) Prior Publication Data
US 2022/0361032 A1 Nov. 10, 2022

(30) Foreign Application Priority Data
Nov. 6, 2020 (CN) .......................... 202011228955.4

(51) Int. Cl.
*H04W 28/02* (2009.01)
*H04W 28/06* (2009.01)
(Continued)

(52) U.S. Cl.
CPC ..... *H04W 28/0221* (2013.01); *H04W 28/065* (2013.01); *H04W 52/0216* (2013.01);
(Continued)

(58) Field of Classification Search
CPC ........... H04W 28/0221; H04W 28/065; H04W 52/0216; H04W 52/0261; H04W 74/02;
(Continued)

(56) References Cited

U.S. PATENT DOCUMENTS

| 2015/0030011 | A1* | 1/2015 | Liu | H04L 1/1893 |
| | | | | 370/336 |
| 2016/0198422 | A1* | 7/2016 | Panta | H04W 52/44 |
| | | | | 370/311 |
| 2020/0137705 | A1* | 4/2020 | Takeda | H04W 56/0015 |

FOREIGN PATENT DOCUMENTS

CN 112995938 A * 6/2021

* cited by examiner

*Primary Examiner* — Robert C Scheibel

(57) ABSTRACT

A micro-power wireless access method and apparatus for the Internet of things for power transmission and transformation equipment involves a time synchronization process, a traffic channel access process, a control channel configuration information access process, and a control channel burst information access process. In the time synchronization process, an aggregation node determines a delay parameter and other parameters based on a timeslot in which traffic information randomly transmitted by a sensing terminal is (Continued)

located, and the sensing terminal adjusts transmission time of a corresponding frame based on the parameters. The traffic channel access process adopts a mode in which one-way reporting is mainly used, to minimize working time of a sensor. The present disclosure realizes limited two-way communication on a control channel, supports configuration of a sensor cycle, a threshold, and other parameters, and supports a retransmission mechanism on the control channel for important alarm information.

18 Claims, 11 Drawing Sheets

(51) Int. Cl.
    *H04W 52/02*     (2009.01)
    *H04W 74/02*     (2009.01)
    *H04W 74/04*     (2009.01)
    *H04W 74/08*     (2009.01)
    *H04W 84/18*     (2009.01)

(52) U.S. Cl.
    CPC ........... *H04W 74/02* (2013.01); *H04W 74/04* (2013.01); *H04W 74/0883* (2013.01); *H04W 84/18* (2013.01)

(58) Field of Classification Search
    CPC ............. H04W 74/04; H04W 74/0883; H04W 74/0808; H04W 84/18; H04W 4/35; H04W 4/38; Y04S 10/50; G06Q 50/06
    See application file for complete search history.

MICRO-POWER WIRELESS ACCESS METHOD AND APPARATUS FOR INTERNET OF THINGS FOR POWER TRANSMISSION AND TRANSFORMATION EQUIPMENT

TECHNICAL FIELD

The present disclosure relates to a micro-power wireless access method and apparatus for the Internet of things for power transmission and transformation equipment, and belongs to the field of sensor access in the Internet of things for power transmission and transformation equipment.

BACKGROUND

With the development of the Internet of Things (IoT), wireless communication and other technologies, there is an increasing demand of applying a wireless sensor network to intelligent operation inspection services in power transmission and transformation. Compared with conventional wired monitoring, wireless transmission can effectively resolve a problem that status sensing data cannot be transmitted in an application scenario, for example, when there is an electrified body or wiring cannot be performed. In addition, wireless transmission can simplify a sensor structure, realize a miniaturized and low-cost sensor, and achieve rapid installation and a plug-and-play function. An overall architecture of the Internet of things for power transmission and transformation equipment is divided into four layers: a sensing layer, a network layer, a platform layer, and an application layer, as shown in FIG. 1.

The sensing layer is composed of various IoT sensors and network nodes, and is divided into a sensor layer and a data aggregation layer to collect and aggregate sensing information. The sensor layer is composed of various IoT sensors, which are used to collect state quantities of different types of devices and upload data to an aggregation node by the network. The IoT sensors are classified into a micro-power wireless sensor, a low-power wireless sensor, and a wired sensor. The data aggregation layer is composed of the aggregation node, an access node, and other network nodes. All kinds of node equipment constitute a sensor network that is fully compatible with a micro-power/low-power wireless sensor network and a wired transmission network and covers all service scenarios.

However, with the gradual application of the wireless sensor network, the following three problems exist. (1) Most of existing IoT sensing devices use private protocols, and cannot be mutually compatible or replaced, resulting in lots of repeated construction of sensor network systems. (2) Wireless spectrum resources are chaotically applied, causing serious mutual interference. China is strengthening management of wireless communication devices, and the private protocols may be illegal. (3) In a complex on-site power transmission and transformation environment, especially in an environment in which a closed box, a live conductor, and the like have a strict requirement on power consumption of the sensor which cannot be easily replaced, the sensor cannot fully meet service requirements by a general wireless sensor network technology (BLE, LORA, or the like) in terms of power consumption and transmission distances.

SUMMARY

In view of the problems in the prior art, considering that there is no unified micro-power narrowband wireless communication protocol in the field of device status sensing in power transmission and transformation in the power industry, the present disclosure carries out selection of a physical layer communication system and independent design of a link layer protocol based on actual needs of an actual power transmission and transformation service, and provides a micro-power wireless access method and apparatus for the Internet of things for power transmission and transformation equipment, to meet requirements for a long service life (more than 6 years) and maintenance free operation of a micro-power sensor with a small amount of data such as temperature, inclination angle and pressure and frequent transmission.

To achieve the above objective, the present disclosure adopts the following technical solutions:

A micro-power wireless access method for the Internet of things for power transmission and transformation equipment is applicable to a sensing terminal in the Internet of things for power transmission and transformation equipment, and includes a time synchronization process, a traffic channel access process, a control channel configuration information access process, and a control channel burst information access process; where in the time synchronization process, the sensing terminal transmits a traffic channel information frame randomly, and an aggregation node determines a delay parameter based on a timeslot in which traffic information of the sensing terminal is located; and the sensing terminal transmits a control channel request frame, receives a control channel response frame that contains the delay parameter, a parameter indicating a traffic cycle length, and a parameter indicating a control cycle length and that is returned by the aggregation node, and adjusts transmission time of the traffic channel information frame and the control channel request frame based on the parameters in the received control channel response frame;

in the traffic channel access process, the sensing terminal performs one-way no-reply transmission in a fixed timeslot of a traffic channel to complete transmission of the traffic information; the sensing terminal is activated from a sleep state to monitor the traffic channel; and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time;

in the control channel configuration information access process, the sensing terminal is activated in a fixed configuration timeslot, transmits the control channel request frame to the aggregation node, and then is in a reception waiting state for a reply waiting cycle; after successfully receiving one control channel response frame each time, the sensing terminal enters a next reply waiting cycle and waits for receiving a next frame; and after successfully receiving a control channel response end frame, the sensing terminal replies with a control channel acknowledgement frame;

in the control channel burst information access process, the sensing terminal is activated when it needs to report a burst, immediately transmits a control channel burst frame on a control channel, and enters the reply waiting cycle; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit; and the traffic channel information frame, the control channel request frame, the control channel response frame, the control channel response end frame, the control channel acknowledgement frame, and the control channel burst frame are distinguished by a frame type field in a media access control (MAC) layer frame header.

Further, in the control channel configuration information access process, when the sensing terminal performs transmission abnormally, the sensing terminal enters the reception waiting state after transmitting the control channel request frame; and if the sensing terminal does not receive a reply within the reply waiting cycle, the sensing terminal enters the sleep state and waits, based on the control cycle length, to be activated next time; and in the control channel burst information access process, the sensing terminal immediately retransmits the control channel burst frame when the corresponding control channel acknowledgement frame is not received within the reply waiting cycle; and stops retransmission and enters the sleep state if the control channel acknowledgement frame is received within a maximum quantity of retransmissions, or enters the sleep state if the control channel acknowledgement frame is not received after the maximum quantity of retransmissions.

A micro-power wireless access method for the Internet of things for power transmission and transformation equipment is applicable to an aggregation node in the Internet of things for power transmission and transformation equipment, and includes a time synchronization process, a traffic channel access process, a control channel configuration information access process, and a control channel burst information access process; where in the time synchronization process, the aggregation node determines a delay parameter based on a timeslot in which a traffic channel information frame transmitted by a sensing terminal is located; and after receiving a control channel request frame of the sensing terminal, the aggregation node records, in a control channel response frame, the delay parameter, a parameter indicating a traffic cycle length, and a parameter indicating a control cycle length that are stored in the aggregation node, and replies to the sensing terminal with the control channel response frame;

in the traffic channel access process, the aggregation node is always in a reception waiting state; and after successfully receiving the traffic channel information frame transmitted by the sensing terminal, if an address of the sensing terminal is not in a blacklist, the aggregation node transmits the traffic channel information frame to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node;

in the control channel configuration information access process, after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; and the aggregation node enters the reception waiting state after transmitting the control channel response frame and the control channel response end frame sequentially;

in the control channel burst information access process, the aggregation node replies with a control channel acknowledgement frame if a control channel burst frame transmitted by the sensing terminal is successfully received and the address of the sensing terminal is successfully matched with the sensing terminal address in the whitelist, or continues to be in the reception waiting state if a control channel burst frame is not successfully received; and the traffic channel information frame, the control channel request frame, the control channel response frame, the control channel response end frame, the control channel acknowledgement frame, and the control channel burst frame are distinguished by a frame type field in a MAC layer frame header.

A micro-power wireless access method for the Internet of things for power transmission and transformation equipment includes a time synchronization process, a traffic channel access process, a control channel configuration information access process, and a control channel burst information access process; where in the time synchronization process, a sensing terminal transmits a traffic channel information frame randomly, and an aggregation node determines a delay parameter based on a timeslot in which received traffic information of the sensing terminal is located; the sensing terminal transmits a control channel request frame, and after receiving the control channel request frame, the aggregation node records, in a control channel response frame, the delay parameter, a parameter indicating a traffic cycle length, and a parameter indicating a control cycle length that are stored, and replies to the sensing terminal with the control channel response frame; and the sensing terminal adjusts transmission time of the traffic channel information frame and the control channel request frame based on the parameters in the received control channel response frame;

in the traffic channel access process, the sensing terminal performs one-way no-reply transmission in a fixed timeslot of a traffic channel to complete transmission of the traffic information, the sensing terminal is activated from a sleep state to monitor the traffic channel, and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time; and the aggregation node is always in a reception waiting state, and after successfully receiving the traffic channel information frame transmitted by the sensing terminal, if an address of the sensing terminal is not in a blacklist, the aggregation node transmits the traffic channel information frame to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node;

in the control channel configuration information access process, the sensing terminal is activated in a fixed configuration timeslot, transmits the control channel request frame to the aggregation node, and then is in the reception waiting state for a reply waiting cycle; after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; after successfully receiving one control channel response frame each time, the sensing terminal enters a next reply waiting cycle and waits for receiving a next frame; the sensing terminal replies with a control channel acknowledgement frame after successfully receiving the control channel response end frame; and the aggregation node enters the reception waiting state after transmitting the control channel response frame and the control channel response end frame sequentially;

in the control channel burst information access process, the sensing terminal is activated when it needs to report a burst, immediately transmits a control channel burst frame on a control channel, and enters the reply waiting cycle; the aggregation node replies with the control channel acknowledgement frame if the control channel burst frame transmitted by the sensing terminal is successfully received and the address of the sensing terminal is successfully matched with the sensing terminal address in the whitelist, or continues to be in the reception waiting state if the control channel burst frame is not successfully received; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit; and the traffic channel information frame, the control channel request frame, the control channel response frame, the control channel response end frame, the control channel acknowledgement frame, and the control channel burst frame are distinguished by a frame type field in a MAC layer frame header.

Further, the MAC layer frame header further includes communication signaling indication, encryption indication, MAC layer load length, and sensing terminal ID fields; and for the traffic channel information frame and the control channel burst frame, a sensing terminal ID in detection data or alarm data of the sensing terminal is omitted, and only a sensing terminal ID in the MAC layer frame header is retained.

Further, to reduce interactions in transmission, a plurality of communication instructions are combined into a single frame and then transmitted, and data carried by a single control channel response frame or control channel response end frame cannot exceed an upper MAC load limit.

Further, physical layer communication between the sensing terminal and the aggregation node supports LORA, BLE, and ZigBee, and a 2.4 GHz frequency band and a 470 MHz to 510 MHz frequency band are selected.

A micro-power wireless access apparatus for a sensing terminal in the Internet of things for power transmission and transformation equipment includes a memory, a processor, and a computer program stored in the memory and able to run on the processor, where the computer program is loaded to the processor to implement the micro-power wireless access method applicable to the sensing terminal in the Internet of things for power transmission and transformation equipment.

A micro-power wireless access apparatus for an aggregation node in the Internet of things for power transmission and transformation equipment includes a memory, a processor, and a computer program stored in the memory and able to run on the processor, where the computer program is loaded to the processor to implement the micro-power wireless access method applicable to the aggregation node in the Internet of things for power transmission and transformation equipment.

A micro-power wireless access apparatus for the Internet of things for power transmission and transformation equipment includes the micro-power wireless access apparatus for a sensing terminal in the Internet of things for power transmission and transformation equipment and the micro-power wireless access apparatus for an aggregation node in the Internet of things for power transmission and transformation equipment.

The present disclosure has the following beneficial effects: The present disclosure adopts an asynchronous communication mode and a random reporting mechanism initiated by a sensor. The sensor does not need to listen to a node message, and is in the sleep state in most time, effectively reducing power consumption of the sensor. The present disclosure focuses on one-way services. For main ordinary detection data, a mode in which one-way reporting is mainly used is used on the traffic channel based on characteristics of a status monitoring service, to minimize working time of the sensor. The present disclosure supports two-way configuration, realizes limited two-way communication on the control channel, and supports configuration of a sensor cycle, a threshold, and other parameters. The present disclosure supports an alarm retransmission mechanism on the control channel for important alarm information, thereby improving reliability of an alarm service. For an actual application scenario of the Internet of things for power transmission and transformation equipment, the present disclosure can not only minimize power consumption, but also meet requirements for reliable service transmission and two-way configuration, and can be well used for standardized access of a device status sensing sensor (such as a temperature sensor, a temperature and humidity sensor, a deformation sensor, or an inclination angle sensor) with high frequency, a small amount of data (below level k), and µA-level power consumption in the Internet of things for power transmission and transformation equipment.

DETAILED DESCRIPTION

Figure 1:
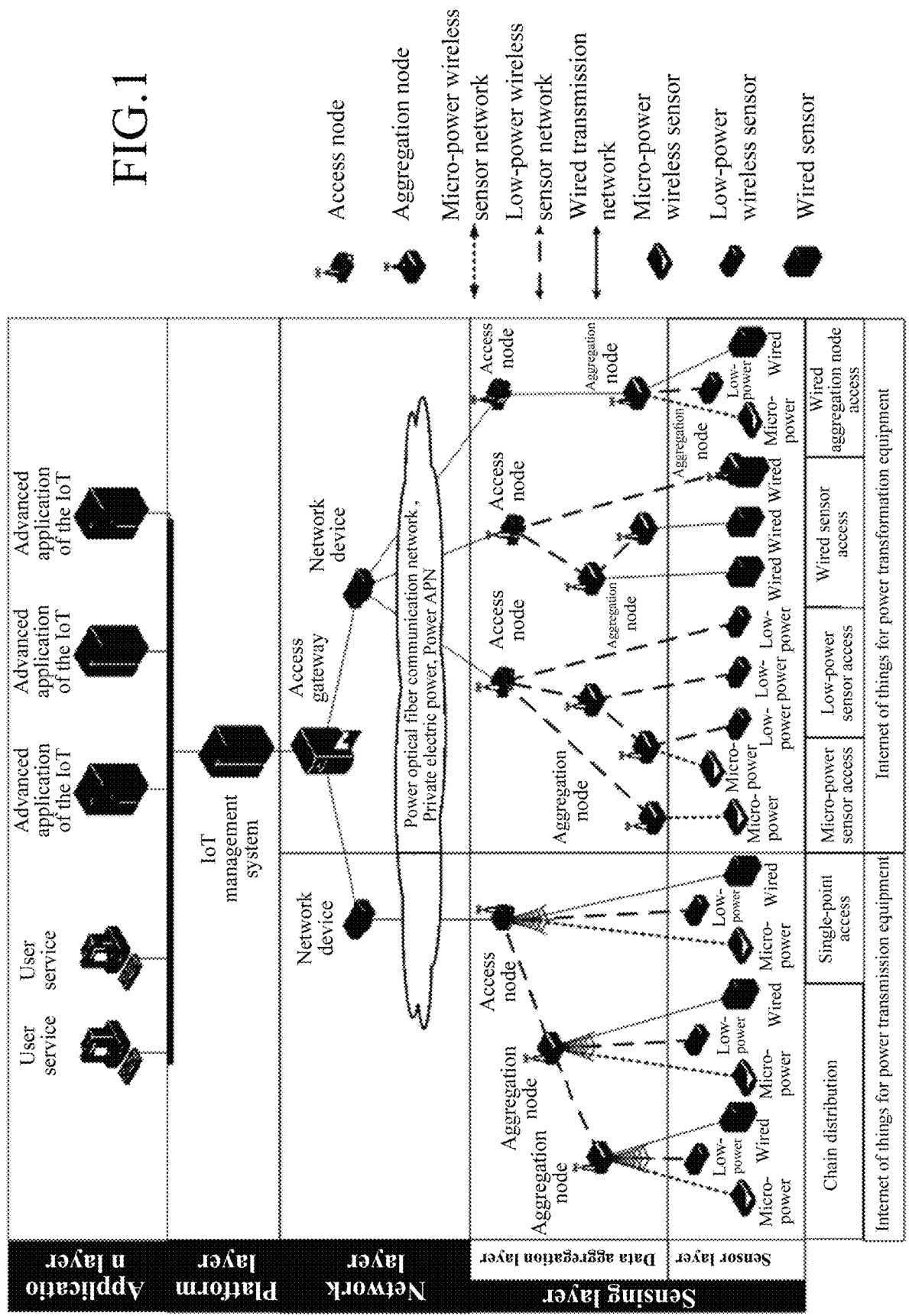
FIG. 1 is an overall architecture diagram of the Internet of things for power transmission and transformation equipment.

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by those of ordinary skill in the art based on the embodiment of the present disclosure without creative efforts shall fall within the scope of the present disclosure.

An embodiment of the present disclosure provides a micro-power wireless access method for the Internet of things for power transmission and transformation equipment. The method is applicable to a sensing terminal in the Internet of things for power transmission and transformation equipment, and includes a time synchronization process, a traffic channel access process, a control channel configuration information access process, and a control channel burst information access process.

In the time synchronization process, the sensing terminal transmits a traffic channel information frame randomly, and an aggregation node determines a delay parameter based on a timeslot in which traffic information of the sensing terminal is located; and the sensing terminal transmits a control channel request frame, receives a control channel response frame that contains the delay parameter, a parameter indicating a traffic cycle length, and a parameter indicating a control cycle length and that is returned by the aggregation node, and adjusts transmission time of the traffic channel information frame and the control channel request frame based on the received parameters.

In the traffic channel access process, the sensing terminal performs one-way no-reply transmission in a fixed timeslot of a traffic channel to complete transmission of the traffic information; the sensing terminal is activated from a sleep state to monitor the traffic channel; and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time.

In the control channel configuration information access process, the sensing terminal is activated in a fixed configuration timeslot, transmits the control channel request frame to the aggregation node, and then is in a reception waiting state for a reply waiting cycle; after successfully receiving one control channel response frame each time, the sensing terminal enters a next reply waiting cycle and waits for receiving a next frame; and after successfully receiving a control channel response end frame, the sensing terminal replies with a control channel acknowledgement frame.

In the control channel burst information access process, the sensing terminal is activated when it needs to report a burst, immediately transmits a control channel burst frame on a control channel, and enters the reply waiting cycle; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit.

An embodiment of the present disclosure provides a micro-power wireless access method for the Internet of things for power transmission and transformation equipment. The method is applicable to a sensing aggregation node in the Internet of things for power transmission and transformation equipment, and includes a time synchronization process, a traffic channel access process, a control channel configuration information access process, and a control channel burst information access process.

In time synchronization process, the aggregation node determines a delay parameter based on a timeslot in which a traffic channel information frame transmitted by a sensing terminal is located; and after receiving a control channel request frame of the sensing terminal, the aggregation node records, in a control channel response frame, the delay parameter, a parameter indicating a traffic cycle length, and a parameter indicating a control cycle length that are stored in the aggregation node, and replies to the sensing terminal with the control channel response frame.

In the traffic channel access process, the aggregation node is always in a reception waiting state; and after successfully receiving the traffic channel information frame transmitted by the sensing terminal, if an address of the sensing terminal is not in a blacklist, the aggregation node transmits the data to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node.

In the control channel configuration information access process, after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; and the aggregation node enters the reception waiting state after transmitting the control channel response frame and the control channel response end frame sequentially.

In the control channel burst information access process, the aggregation node replies with a control channel acknowledgement frame if a control channel burst frame transmitted by the sensing terminal is successfully received and the matching is completed, or continues to be in the reception waiting state if a control channel burst frame is not successfully received.

With reference to the above sensing terminal and aggregation node, an embodiment of the present disclosure provides a micro-power wireless access method for the Internet of things for power transmission and transformation equipment. The method includes a time synchronization process, a traffic channel access process, a control channel configuration information access process, and a control channel burst information access process.

In the time synchronization process, the sensing terminal transmits a traffic channel information frame randomly, and the aggregation node determines a delay parameter based on a timeslot in which received traffic information of the sensing terminal is located; the sensing terminal transmits a control channel request frame, and after receiving the control channel request frame, the aggregation node records, in a control channel response frame, the delay parameter, a parameter indicating a traffic cycle length, and a parameter indicating a control cycle length that are stored, and replies to the sensing terminal with the control channel response frame; and the sensing terminal adjusts transmission time of the traffic channel information frame and the control channel request frame based on the received parameters.

In the traffic channel access process, the sensing terminal performs one-way no-reply transmission in a fixed timeslot of a traffic channel to complete transmission of the traffic information, the sensing terminal is activated from a sleep state to monitor the traffic channel, and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time; and the aggregation node is always in a reception waiting state, and after successfully receiving the traffic channel information frame transmitted by the sensing terminal, if an address of the sensing terminal is not in a blacklist, the aggregation node transmits the data to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node.

In the control channel configuration information access process, the sensing terminal is activated in a fixed configuration timeslot, transmits the control channel request frame to the aggregation node, and then is in the reception waiting state for a reply waiting cycle; after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; after successfully receiving one control channel response frame each time, the sensing terminal enters a next reply waiting cycle and waits for receiving a next frame; the sensing terminal replies with a control channel acknowledgement frame after successfully receiving the control channel response end frame; and the aggregation node enters the reception waiting state after transmitting the control channel response frame and the control channel response end frame sequentially.

In the control channel burst information access process, a random two-way interaction mode with a stop-and-wait retransmission mechanism is adopted. Specifically, the sensing terminal is activated when it needs to report a burst, immediately transmits a control channel burst frame on a control channel, and enters the reply waiting cycle; the aggregation node replies with the control channel acknowledgement frame if the control channel burst frame transmitted by the sensing terminal is successfully received and the matching is completed, or continues to be in the reception waiting state if the control channel burst frame is not successfully received; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit.

A specific communication protocol involved in the embodiments of the present disclosure is described in detail below. Based on a design, a micro power wireless network communication protocol for the Internet of things for power transmission and transformation equipment in the present disclosure is mainly divided into a physical layer design and a link layer. Selection of a communication system at the physical layer: On a work basis of mainstream sensor manufacturers, LORA, BLE, and ZigBee are selected at the physical layer. On the one hand, the above three communication chips have low power consumption, their sleep currents are less than 1 uA, and their transmission power and reception power are tens of mA, which can meet a service requirement of the narrowband IoT. On the other hand, the above three communication chips are compatible with hardware configurations of current mainstream sensor manufacturers. A frequency band meets regulations formulated by the State Radio Regulatory Commission of the People's Republic of China on use of a micro-power frequency band. A 2.4 GHz frequency band and a 470 MHz to 510 MHz frequency band are selected, specifically corresponding to 2.4G LORA, 470M LORA, 2.4G BLE5.0, and 2.4G ZigBee. LORA has an advantage of long-distance transmission.

A network topology includes an aggregation node and a sensing terminal. The network is configured as a star network model, in other words, a plurality of sensing terminals are directly connected to one aggregation node. This network model supports two kinds of communication transmission: one-way transmission and two-way transmission. In the one-way transmission, the aggregation node is directly connected to the sensing terminal on a separate channel. The sensing terminal uploads data through an uplink. The one-way transmission can only be initiated by the sensing terminal and received by the aggregation node. In the two-way transmission, the sensing terminal and the aggregation node perform data transmission through an uplink and a downlink of a specified channel. When a plurality of sensing terminals are connected to a same aggregation node orderly, the two-way transmission is initiated by the sensing terminal on the uplink and is responded to by the aggregation node on the downlink.

A frame structure at the physical layer is shown in Table 1. For a chirp spread spectrum (CSS) physical layer, physical layer header, physical layer header check, and physical layer load check fields are mandatory. For an IEEE802.15.4 physical layer, the physical layer header check and physical layer load check fields are not required, and the physical layer header field is mandatory. For a BLE5.0 physical layer, the physical layer header check field is not required, and the physical layer header and physical layer load check fields are mandatory. The physical layer is provided with two working frequency bands: a 470 MHz to 510 MHz frequency band and a 2400 MHz to 2483.5 MHz frequency band.

TABLE 1

Frame structure at the physical layer

| Preamble | Physical layer header (optional) | Physical layer header check (optional) | Physical layer load | Physical layer load check (optional) |
| --- | --- | --- | --- | --- |

Figure 2:
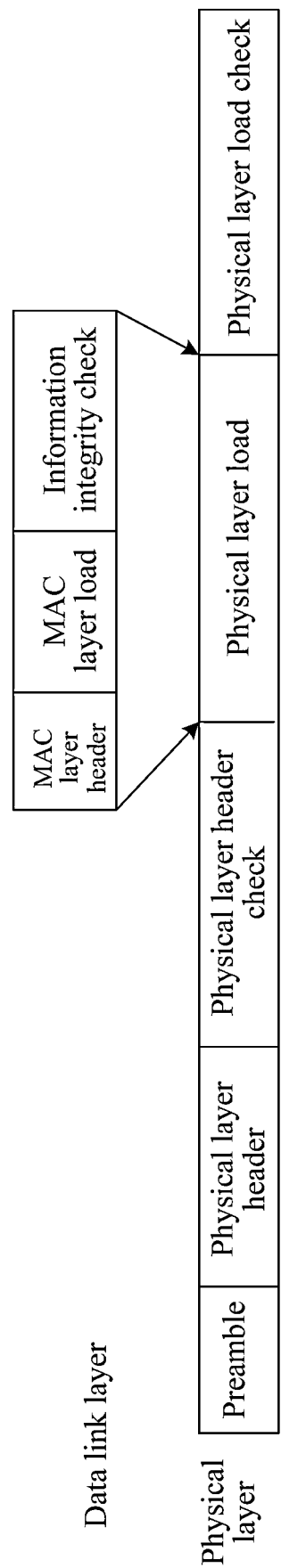
FIG. 2 is a frame structure relationship between a data link layer and a physical layer.

On a basis that the physical layer provides a service, a data link layer provides a service to an upper layer. A frame structure relationship between the data link layer and the physical layer is shown in FIG. 2. Transmitted data uses a frame structure as a basic unit. The frame structure is shown in Table 2. The physical layer load field has a length of 9 to 264 bytes, and is used to record data to be transmitted at the physical layer. Cyclic redundancy check (CRC) is used in the physical layer load field.

TABLE 2

Structure of the physical layer load field

| Field name | MAC layer header | MAC layer load | Information integrity check |
| --- | --- | --- | --- |
| Field length | (8 bytes) | (0 to 255 bytes) | (1 byte) |

The MAC layer header field describes configuration information such as a frame type, and a length of the load field, and a sensing terminal ID. The MAC layer load field carries data transmitted at a MAC layer. A data structure of this field is organized and encoded based on a definition of a frame type field. The information integrity check field is used to check the MAC layer header field and the MAC layer load field and determine whether transmitted data is tampered with by a third party. A check method is to accumulate the MAC layer header field and the MAC layer load field in units of one byte, and an accumulation result is filled into the information integrity check field as a value of the information integrity check field.

The MAC layer header field consists of frame type (MType), communication signaling indication (CC_Ind), encryption indication (Key_If), MAC layer load length (Length) and sensing terminal ID fields, as shown in Table 3.

TABLE 3

Structure of the MAC layer header field

| Field name | Frame type | Communication signaling indication | Encryption indication | MAC layer load length | Sensing terminal ID |
| --- | --- | --- | --- | --- | --- |
| Field length | (4 bits) | (1 bit) | (3 bits) | (1 byte) | (6 bytes) |

The frame type field has a length of 4 bits, and defines a specific type and function of a frame. Specific codes and corresponding meanings of the frame type field are shown in Table 4.

TABLE 4

Content of the frame type field

| Bit sequence | Frame type | Description |
| --- | --- | --- |
| 0b0000 | MESSAGE | Traffic channel information frame |
| 0b0001 | REQ | Control channel request frame |
| 0b0010 | RSP | Control channel response frame |
| 0b0011 | RSP_END | Control channel response end frame |
| 0b0100 | BURST | Control channel burst frame |
| 0b0101 | ACK | Control channel acknowledgement frame |
| Others | RFU | Reserved |

The communication signaling indication (CC_Ind) field is used to indicate that the MAC layer load field indicates a service or communication instruction; A value 0b1 represents a control message, and a value M0 represents the communication instruction. This indication field is valid only in the control channel response frame (RSP frame) or the control channel response end frame (RPS_END frame). The encryption indication field indicates whether the transmitted MAC layer load field and information integrity check field are encrypted, and has a length of 3 bits. A value 0 indicates no encryption, and a value 1 indicates encryption. The MAC layer load length field defines a byte length of the MAC layer load field, and has a length of 1 byte. Therefore, the MAC layer load field has a length of 0 to 255 bytes. The sensing terminal ID field defines a unique identifier of a sensing terminal device in the network, and each sensing terminal is be assigned a unique sensing terminal address. The sensing terminal ID field has a length of 6 bytes. The traffic channel information frame (MESSAGE) is a type of a frame transmitted on a traffic channel, and is mainly used to orderly transmit data of a transmitting end to a receiving end based on a specified data format and transmission rule. The traffic channel information frame is used by the sensing terminal to report a monitoring message. To reduce an amount of transmitted data, the sensing terminal ID field in detection data is omitted, and only the sensing terminal ID field in a MAC layer frame header is retained. The control channel burst frame (BURST) is a type of a frame transmitted on a control channel, and is used by the sensing terminal to report an alarm message. To reduce an amount of transmitted data, the sensing terminal ID field in alarm data is omitted, and only the sensing terminal ID field in the MAC layer frame header is retained.

The control channel request frame (REQ) is a type of a frame transmitted on the control channel, and is mainly used by the transmitting end to transmit information to the receiving end according to a specific transmission rule and request a reply. The transmitting end writes data into a request data type field as required. The MAC layer load field in the control channel request frame consists of an information type field and a reserved field. The control channel response frame can carry the communication instruction or the control message. The control channel response frame (RSP) is a type of a frame transmitted on the control channel, and is mainly used by the receiving end to reply to the transmitting end with control information based on the information type field in the control channel request frame after receiving the control channel request frame. The communication instruction and the control message cannot be transmitted in a same RSP frame or control channel response end frame (RSP_END) at the same time. A value of the communication signaling indication field in the MAC layer frame header is 0b0.

To reduce interactions in transmission, a plurality of communication instructions are combined into a single frame and then transmitted. A data structure of a single frame is shown in Table 5. Data carried by a single RSP or RPS_END frame cannot exceed an upper MAC load limit, namely, 255 bytes. Each piece of communication instruction data consists of a communication instruction type field and a communication instruction content field, as shown in Table 6. For definitions of the communication instruction type field and the communication instruction content field, refer to Table 7.

TABLE 5

| Structure of communication signaling data | | | |
|---|---|---|---|
| Communication instruction 1 | Communication instruction 2 | ... Communication instruction i | ... Communication instruction N |

Note 1:
The field "communication instruction i" specifies a replied $i^{th}$ communication instruction, and the field "communication instruction N" specifies a last replied communication instruction.
Note 2:
A unified data format is used for each group of data. For a specific format, refer to Table 6.

TABLE 6

| Structure of the communication signaling data Data i | |
|---|---|
| Communication instruction type (1 byte) | Communication instruction content (variable length) |

TABLE 7

| Structure of the communication signaling data | | | |
|---|---|---|---|
| Communication instruction type | Value of the communication instruction type | Length of the communication instruction content/byte | Unit |
| Traffic cycle length | 0b00000000 | 4 | ms |
| Control cycle length | 0b00000001 | 2 | /Traffic cycle |
| Delay | 0b00000010 | 4 | ms |
| Maximum random perturbation duration | 0b00000011 | 1 | /5 ms |
| Traffic channel frequency | 0b00000100 | 1 | — |
| Physical layer parameter configuration | 0b00000101 | 1 | — |
| Reply waiting cycle of the REQ frame | 0b00000110 | 1 | ms |
| Reply waiting cycle of the BURST frame | 0b00000111 | 1 | ms |
| Reserved | Others | ... | — |
| Combination of the traffic cycle and the control cycle + delay + random backoff duration | 0b11111111 | 11 | — |

The traffic cycle length is defined as a cycle of transmitting traffic information by the transmitting end. The control cycle length is defined as a cycle of transmitting a control information request by the transmitting end, and is in units of the traffic cycle (default or configured traffic cycle). When the control cycle is 0, the transmitting end does not transmit a control information request frame. When the control cycle is 1, one control channel request frame is transmitted and no traffic channel information frame is transmitted in each traffic cycle. When the control cycle is m, one control channel request frame and m−1 traffic channel information frames are transmitted every m traffic cycles. The delay is defined as a time offset of traffic information transmission time. The maximum random perturbation duration is defined as a maximum allowable range that the transmission time of the transmitting end deviates from reference transmission time, in units of 5 ms. Random perturbation duration is used together with the delay to determine the transmission time of the transmitting end. The traffic channel frequency is used to control a frequency of the traffic channel. The traffic channel frequency cannot be dynamically configured by default. The traffic channel is configured at a fixed frequency by default and adopts a default physical layer configuration. Based on an instruction of the aggregation node, the sensing terminal can transfer from a default traffic channel frequency to another traffic channel frequency point for communication. The physical layer parameter configuration is used to specify numbers of physical layer parameter configurations of the traffic channel and the control channel. The physical layer parameters cannot be dynamically configured by default. Based on the instruction of the aggregation node, the sensing terminal can perform configuration based on the specified numbers of the physical layer parameter configurations. The reply waiting cycle of the REQ frame is defined as a time in which the transmitting end waits for a reply after transmitting the REQ frame. The reply waiting cycle of the BURST frame is defined as a time in which the transmitting end waits for a reply after transmitting the BURST frame.

The value of the communication signaling indication (CC_Ind) field in the MAC layer frame header is 0b1. The MAC layer load field carries the control message. To reduce an amount of transmitted data, the sensing terminal ID field in the message is omitted, and only the sensing terminal ID field in the MAC layer frame header is retained. The control channel response end frame (RSP_END) is an extension of the control channel response frame. When the transmitting end replies with the control channel response frame, it indicates that information transmitted by the transmitting end does not end and there still is information to be transmitted subsequently. When the transmitting end replies with the control channel response end frame, it indicates that information transmitted by the transmitting end this time is over and there is no new frame to be transmitted. The MAC layer load field in the control channel response end frame is the same as that in the control channel response frame. The control channel acknowledgement frame is a type of a frame transmitted on the control channel, and is mainly used by the receiving end to transmit the control channel acknowledgement frame to the transmitting end after receiving a frame for which an acknowledgement is required. For usage of the control channel acknowledgement frame, refer to Table 8. The MAC layer load field in the control channel acknowledgement frame consists of an ACK_Type field and a DATA field. The ACK_Type field defines a type of the control channel acknowledgement frame, and has a length of 1 byte.

The DATA field specifies data to be transmitted in the control channel acknowledgement frame, and has a length of 0 to 254 bytes.

TABLE 8

Usage of the control channel acknowledgement frame

| Type of a transmitted frame | Whether an ACK frame is required (Y/N) |
| --- | --- |
| Traffic channel information frame | N |
| Control channel request frame | N |
| Control channel response frame | N |
| Control channel response end frame | Y |
| Control channel burst frame | Y |

The reserved frame is a type of a frame that is newly defined by a user as required. Based on a function to be added, a user can define and design a structure and an encoding form of this frame without conflicting with the existing frames. A new frame format and code need to be updated at the same time in devices of transmitting and receiving parties to ensure reliability of communication between the transmitting and receiving parties. The reserved frame increases scalability of the protocol.

Based on the above physical layer selection and the design of the MAC layer protocol fields, a specific embodiment of the micro-power wireless access method for the Internet of things for power transmission and transformation equipment in the embodiments of the present disclosure is described in detail below.

1. Time Synchronization

The present disclosure uses a frequency division multiple access (FDMA) technology to divide a frequency band into a traffic channel and a control channel. On each traffic channel, a fuzzy time division multiple address (TDMA) mechanism is used to realize information access. Detailed time division is performed on each channel and corresponding time parameters are configured. Table 9 shows types and names of configurable time parameters. These parameters may be configured in a control channel access process.

TABLE 9

Types and names of the configurable time parameters

| Time definition type | Parameter Name | Initial value | |
| --- | --- | --- | --- |
| Traffic cycle length | Message_Cycle | 5 min | |
| Quantity of timeslots in a traffic cycle | Time_Slot | 200 | |
| Control cycle length | Control_Cycle | 1 h | |
| Reply waiting cycle | Wait_Cycle | 470-510 MHz band 150 ms | 2400-2483.5 MHz band 30 ms |
| Transmission interval of consecutive frames | Transmission_Interval | 20 ms | |
| Maximum random perturbation duration | Random_Pert | 5 ms | |
| Delay | Delay | — | |

The traffic cycle length (Message_Cycle) is defined as a cycle of transmitting traffic information by a transmitting end, in other words, a time interval for successively transmitting the traffic information twice by the transmitting end. The quantity of timeslots in a traffic cycle (Time_Slot) is defined as a quantity of timeslots obtained by dividing one traffic cycle. The control cycle length (Control_Cycle) is defined as a cycle of transmitting control information by the transmitting end, in other words, a time interval for successively transmitting the control information twice by the transmitting end. The reply waiting cycle (Wait_Cycle) is defined as a time for waiting a reply by the transmitting end, in other words, a time in which the transmitting is in a reception waiting state after transmitting a frame for which a rely is required. The transmission interval of consecutive frames (Transmission_Interval) is defined as a frame transmission interval when the transmitting end transmits a plurality of consecutive control channel response frames (RSPs). A value of this parameter needs to be less than that of the reply waiting time (Wait_Cycle) of the transmitting end. The maximum random perturbation duration (Random_Pert) is defined as a maximum value of an absolute value of a random number used by the transmitting end to control the transmission time. The maximum random perturbation duration is 5 ms by default, in other words, a random perturbation value is a random number within −5 ms to +5 ms. The delay (Delay) is used to adjust transmission time of a traffic channel information frame (MESSAGE), such that the traffic channel information frame is transmitted at next traffic time delayed by a corresponding time.

Figure 3:
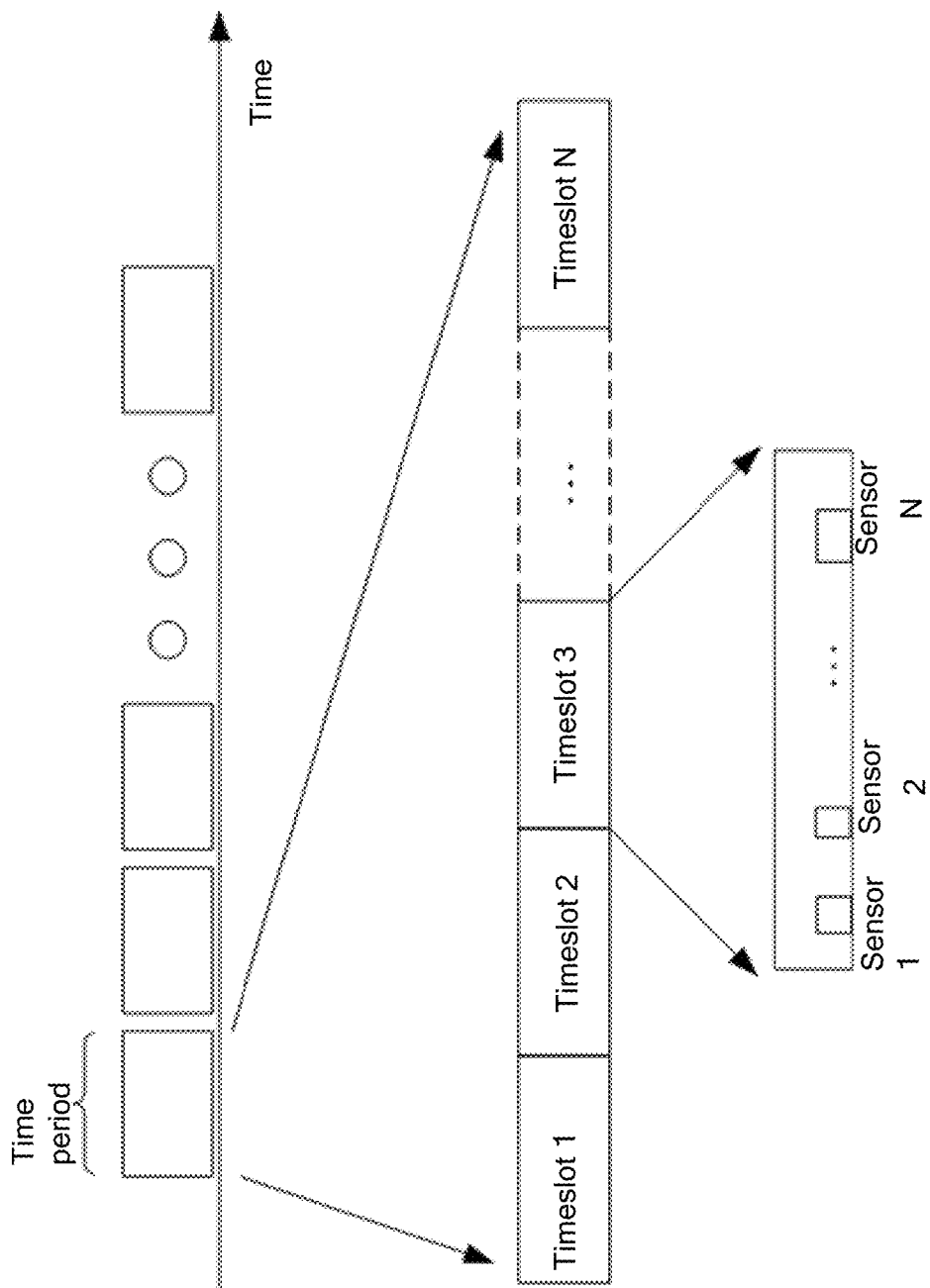
FIG. 3 is a schematic diagram of dividing a timeslot.

The present disclosure adopts fuzzy timeslot synchronization for time synchronization to reduce energy consumption of a sensing terminal. A time is segmented by an aggregation node, and then each time segment is evenly divided into a plurality of timeslots. A quantity of timeslots is far less than a quantity of sensing terminals in a network. In addition, a length of each timeslot is greater than a time length during which a single sensing terminal transmits traffic information once. Therefore, each timeslot can accommodate a plurality of sensing terminals. Specific timeslot division is shown in FIG. 3.

In a time synchronization process, the aggregation node determines the delay, the traffic cycle length, and the control cycle length based on a timeslot in which received traffic information of the sensing terminal is located. The aggregation node can take statistics on an occupied timeslot resource based on time reported by a sensor and the traffic cycle length. Considering a sensor that has been online, a timeslot of the sensor is adjusted by a control channel response frame to reduce a collision probability. Specifically, the sensing terminal first randomly transmits the traffic channel information frame (MESSAGE). After receiving the traffic channel information frame (MESSAGE), the aggregation node records the received time, and calculates an interval between the time and time when a next traffic channel information frame (MESSAGE) is transmitted, namely, the delay. After receiving a control channel request frame (REQ) of the sensing terminal, the aggregation node records, in a control channel response frame (RSP), the delay, the traffic cycle length, and the control cycle length that are stored in the aggregation node, and replies to the sensing terminal with the control channel response frame. The sensing terminal adjusts transmission time of the traffic channel information frame (MESSAGE) and the control channel request frame (REQ) based on the above parameters. Time synchronization is completed through parameter interaction described above.

2. Traffic Channel Access

The aggregation node stores two sensing terminal lists: a whitelist and a blacklist. The two lists are empty during initialization. An access initialization process is as follows:

a) The whitelist records a sensing terminal address that needs to be controlled by the aggregation node. After receiving the control channel request frame (REQ) transmitted by the sensing terminal, the aggregation node replies to the sensing terminal with the control channel response frame (RSP) or a control channel response end frame (RSP_END) if an address of the sensing terminal is in the whitelist, or discards the frame if an address of the sensing terminal is not in the whitelist.

b) The blacklist records a sensing terminal address to which the traffic information is not forwarded by the aggregation node. After receiving the traffic channel information frame (MESSAGE) transmitted by the sensing terminal, the aggregation node transmits the data to an upper layer (namely, a data application layer) if the address of the sensing terminal is not in the blacklist, or discards the frame if the address of the sensing terminal is in the blacklist.

c) If the aggregation node receives traffic information transmitted by a sensing terminal that is neither in the whitelist nor in the blacklist, the aggregation node considers the sensing terminal as a newly added sensing terminal. After the aggregation node receives the traffic information of the sensing terminal, the upper layer determines whether the sensing terminal belongs to the whitelist or the blacklist of the current aggregation node.

Figure 4:
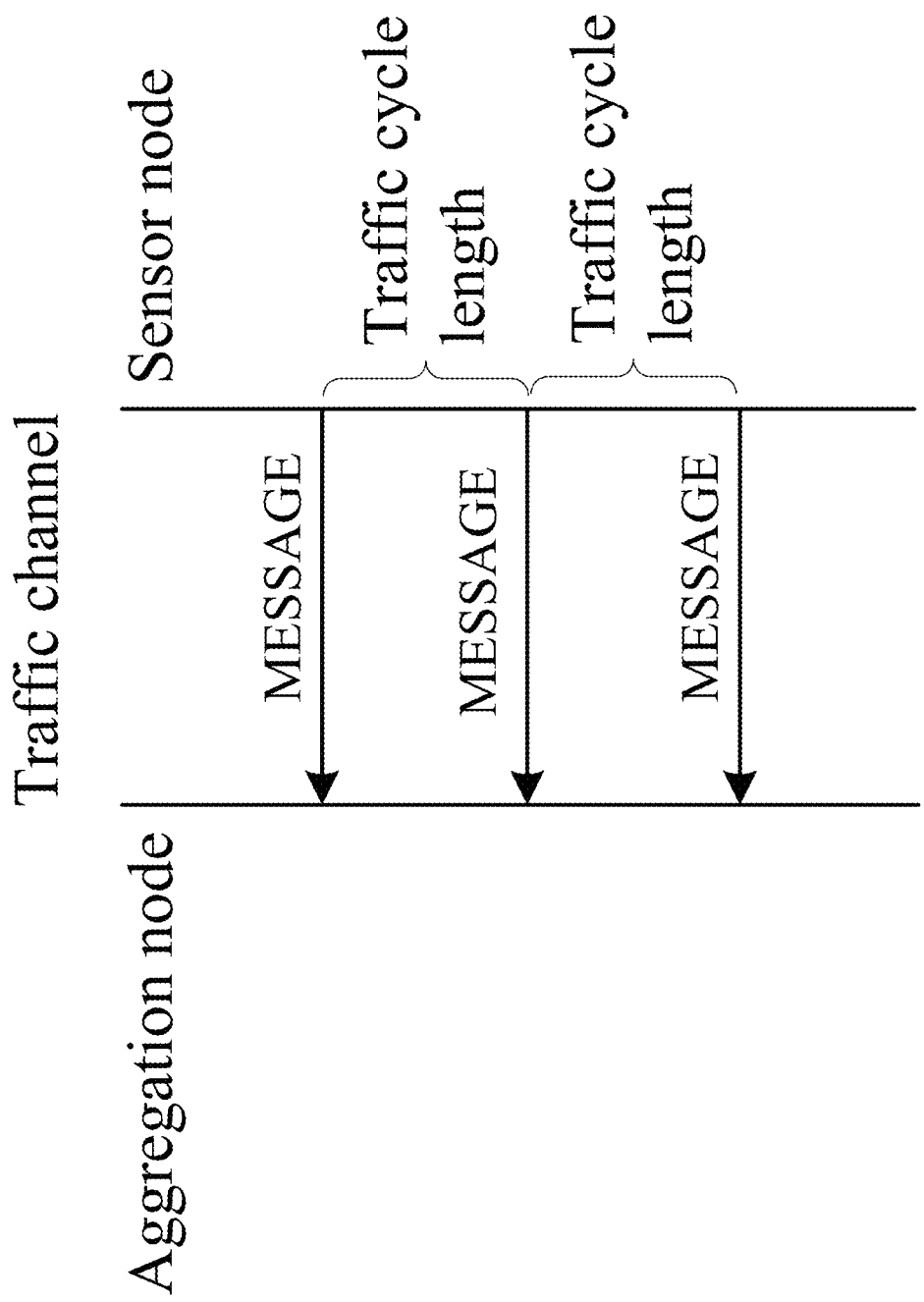
FIG. 4 shows a transmission process of a traffic channel.

On the traffic channel, a fuzzy TDMA mechanism is used to realize random access of a large quantity of sensing terminals. As shown in FIG. 4, a specific access process is as follows:

a) The sensing terminal performs one-way no-reply transmission in a fixed timeslot of the traffic channel to complete transmission of the traffic information.

b) On the traffic channel, the sensing terminal is activated from a sleep state in a specific timeslot to monitor the traffic channel. If the traffic channel is busy, the sensing terminal enters the sleep state and waits, based on the traffic cycle length, to be activated next time; or if the traffic channel is idle, the sensing terminal randomly backs off for one piece of random backoff duration (Random_backoff), transmits the traffic channel information frame to the aggregation node, enters the sleep state, and then waits, based on the traffic cycle length, to be activated next time.

c) The aggregation node is always in a reception waiting state. The aggregation node saves the traffic information (performs processing based on specific rules of the whitelist and the blacklist) if the traffic channel information frame transmitted by the sensing terminal is successfully received, or discards the traffic channel information frame if the traffic channel information frame transmitted by the sensing terminal is not successfully received.

3. Control Channel Configuration Information Access

Figure 5:
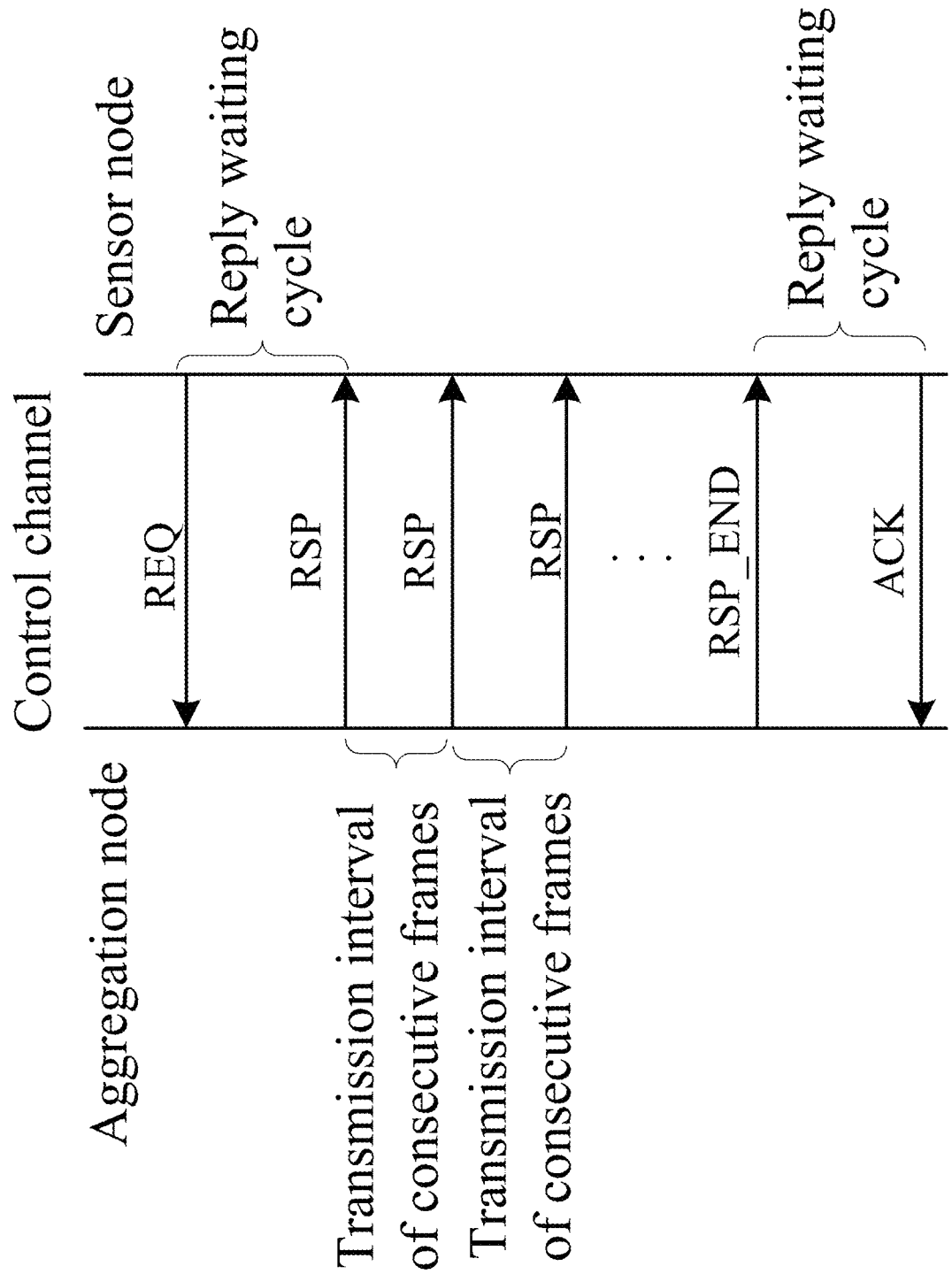
FIG. 5 shows a configuration information request and response process of a control channel.

FIG. 5 shows a control channel configuration information request and response process. A specific access process is as follows:

a) The sensing terminal is activated in a fixed configuration timeslot, transmits the control channel request frame to the aggregation node, and then is in the reception waiting state for the rely waiting cycle (Wait_Cycle).

b) After correctly receiving the control channel request frame transmitted by the sensing terminal, the aggregation node matches the address of the sensing terminal with a sensing terminal address in the whitelist. The aggregation node transmits the control channel response frame or the control channel response end frame to the sensing terminal if the matching is successful, or continues to be in the reception waiting state if the matching is unsuccessful.

c) When content to be replied by the aggregation node is greater than a length of one frame, the aggregation node successively transmits a plurality of frames, and transmits the control channel response frame (RSP) in the first N−1 frames and the control channel response end frame (RSP_END) in a last frame. A transmission interval is the transmission interval of consecutive frames (Transmission_ Interval).

d) After successfully receiving one control channel response frame (RSP) each time, the sensing terminal enters a next reply waiting cycle (Wait_Cycle) and waits for receiving a next frame.

e) After successfully receiving the control channel response end frame (RSP_END), the sensing terminal replies with a control channel acknowledgement frame (ACK).

Figure 6:
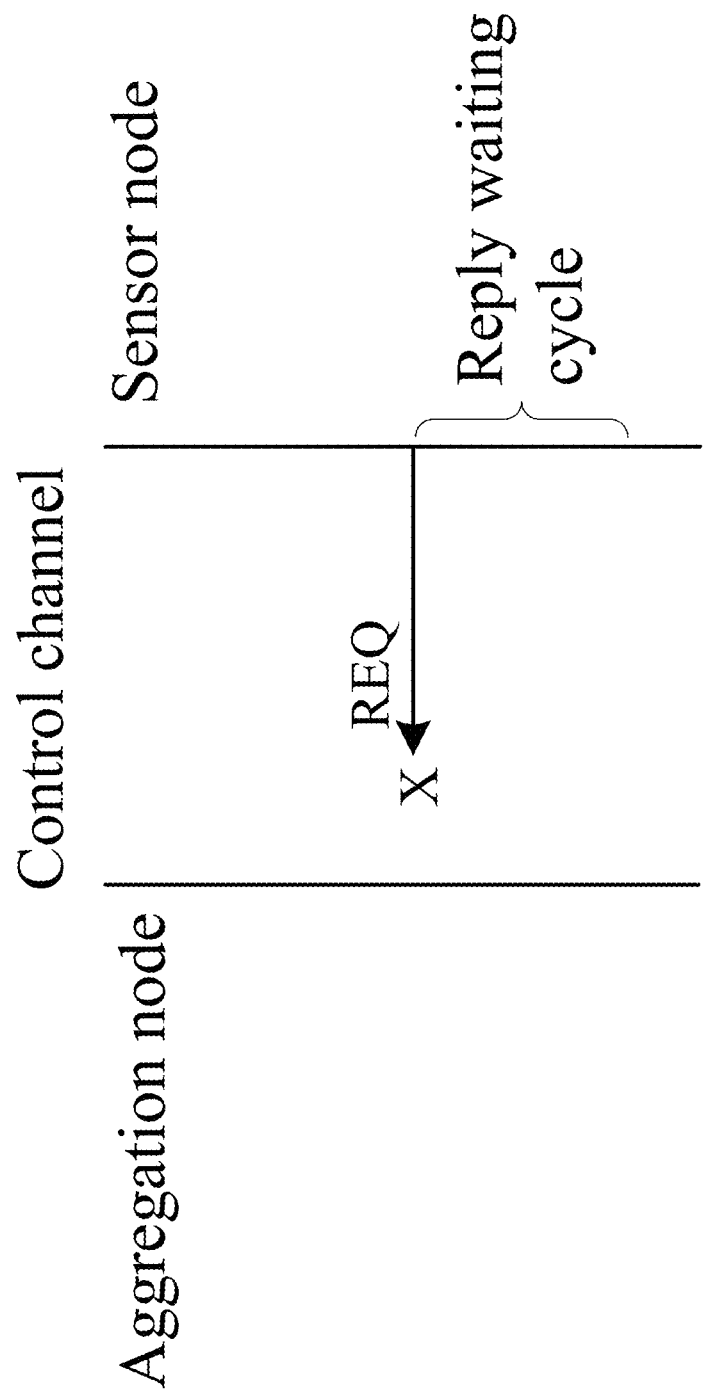
FIG. 6 shows a request transmission abnormality of a sensing terminal.

Abnormal transmission by the sensing terminal means that the control channel request frame (REQ) transmitted by the sensing terminal is not successfully received by the aggregation node due to a transmission error or a matching error. When the sensing terminal performs transmission abnormally, the sensing terminal enters the reception waiting state after transmitting the control channel request frame (REQ). If the sensing terminal does not receive a reply within the reply waiting cycle (Wait_Cycle), the sensing terminal enters the sleep state, and waits, based on the control cycle length, to be activated next time, and the aggregation node continues to be in the reception waiting state, as shown in FIG. 6.

Figure 7:
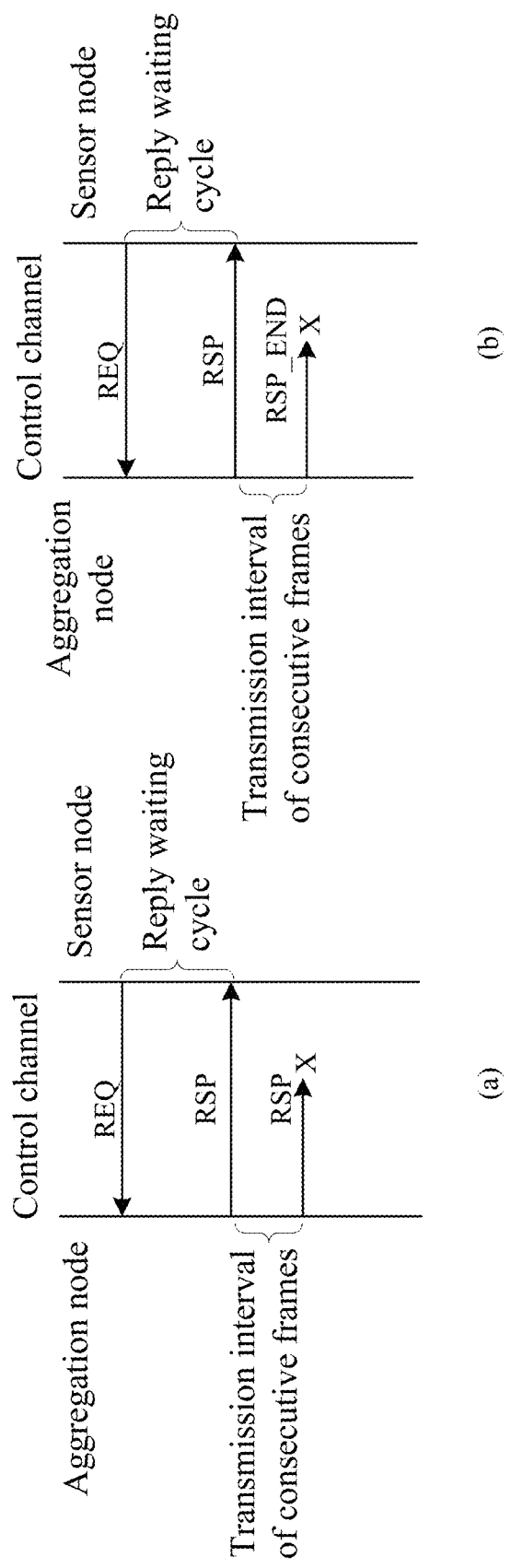
FIG. 7 shows a response transmission abnormality of an aggregation node.

Abnormal transmission by the aggregation node means that the control channel response frame (RSP) or the control channel response end frame (RSP_END) transmitted by the aggregation node is not successfully received by the sensing terminal due to a transmission error or a matching error. When the aggregation node performs transmission abnormally, if the sensing terminal does not receive a reply within the reply waiting cycle (Wait_Cycle), the sensing terminal enters the sleep state, and waits, based on the control cycle length, to be activated next time. The aggregation node enters the reception waiting state after transmitting the control channel response frame (RSP) and the control channel response end frame (RSP_END) sequentially, as shown in FIG. 7.

Figure 8:
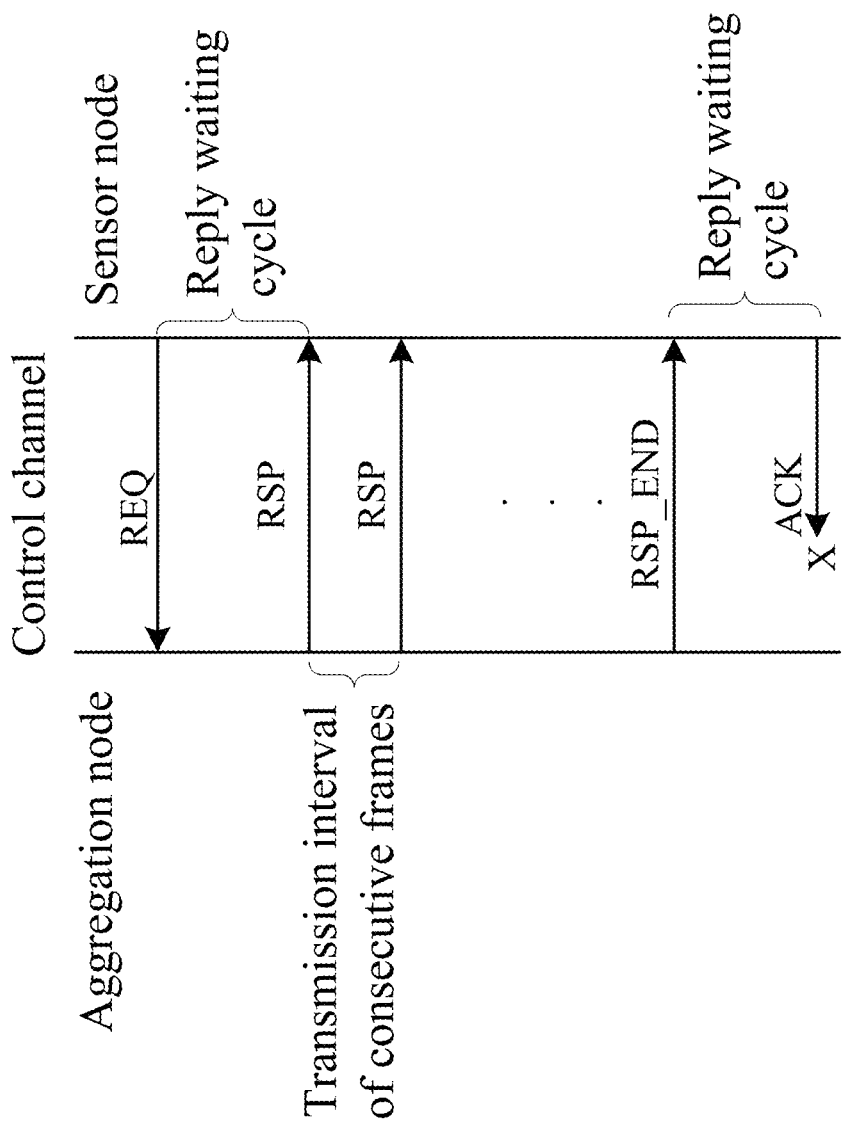
FIG. 8 shows an acknowledgement reply abnormality of a sensing terminal.

An abnormal reply made by the sensing terminal means that the control channel acknowledgement frame (ACK) replied by the sensing terminal is not successfully received by the aggregation node due to a transmission error or a matching error. When the sensing terminal makes a reply abnormally, the sensing terminal replies to the aggregation node with the control channel acknowledgement frame (ACK) after successfully receiving the control channel response end frame (RSP_END), enters the sleep state, and waits, based on the control cycle length, to be activated next time. The aggregation node enters the reception waiting state after transmitting the control channel response end frame (RSP_END), as shown in FIG. 8.

4. Control Channel Burst Information Access

Figure 9:
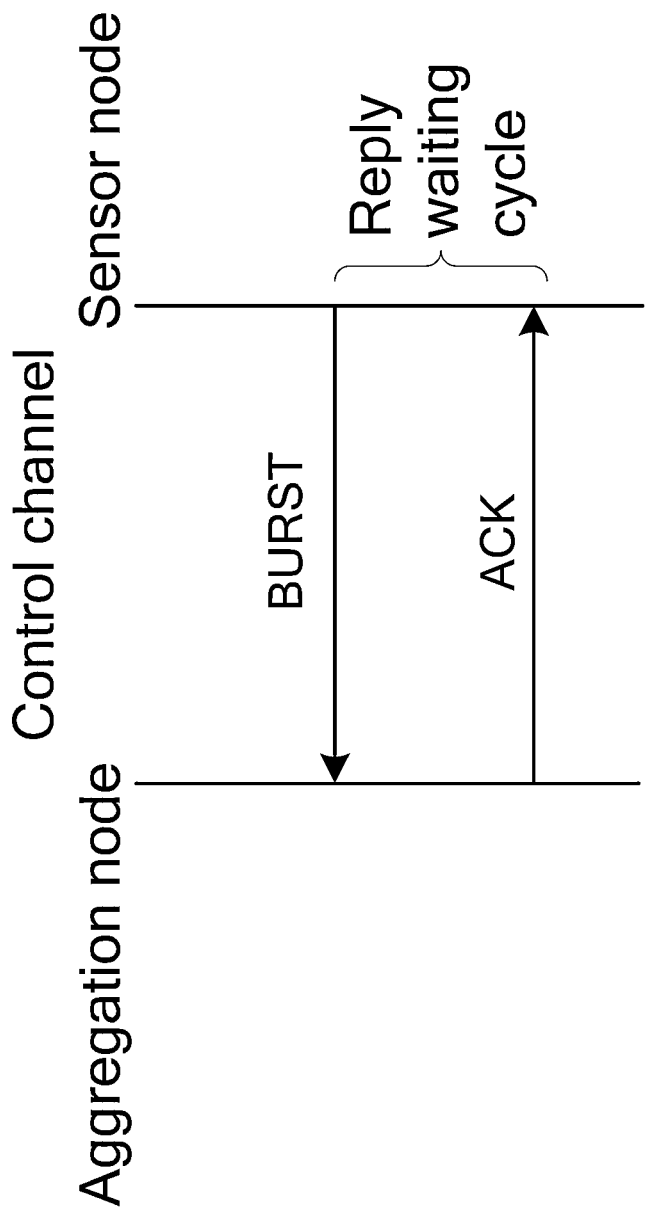
FIG. 9 shows a burst information request and response process of a control channel.

The control channel burst information access process is suitable for transmission of burst traffic, and adopts a random two-way interaction mode with a stop-and-wait retransmission mechanism. The sensing terminal is activated when it needs to report a burst, immediately transmits a control channel burst frame (BURST) on the control channel, and enters the reply waiting cycle (Wait_Cycle). The aggregation node replies with the control channel acknowledgement frame (ACK) if the control channel burst frame transmitted by the sensing terminal is successfully received and the matching is completed, or continues to be in the reception waiting state if the control channel burst frame is not successfully received. If the sensing terminal does not successfully receive the control channel acknowledgement frame (ACK), the sensing terminal uses a retransmission mechanism until the sensing terminal successfully receives the control channel acknowledgement frame (ACK) or a quantity of retransmission times reaches an upper retransmission limit. A burst information request and response process of the control channel is shown in FIG. 9.

Figure 10:
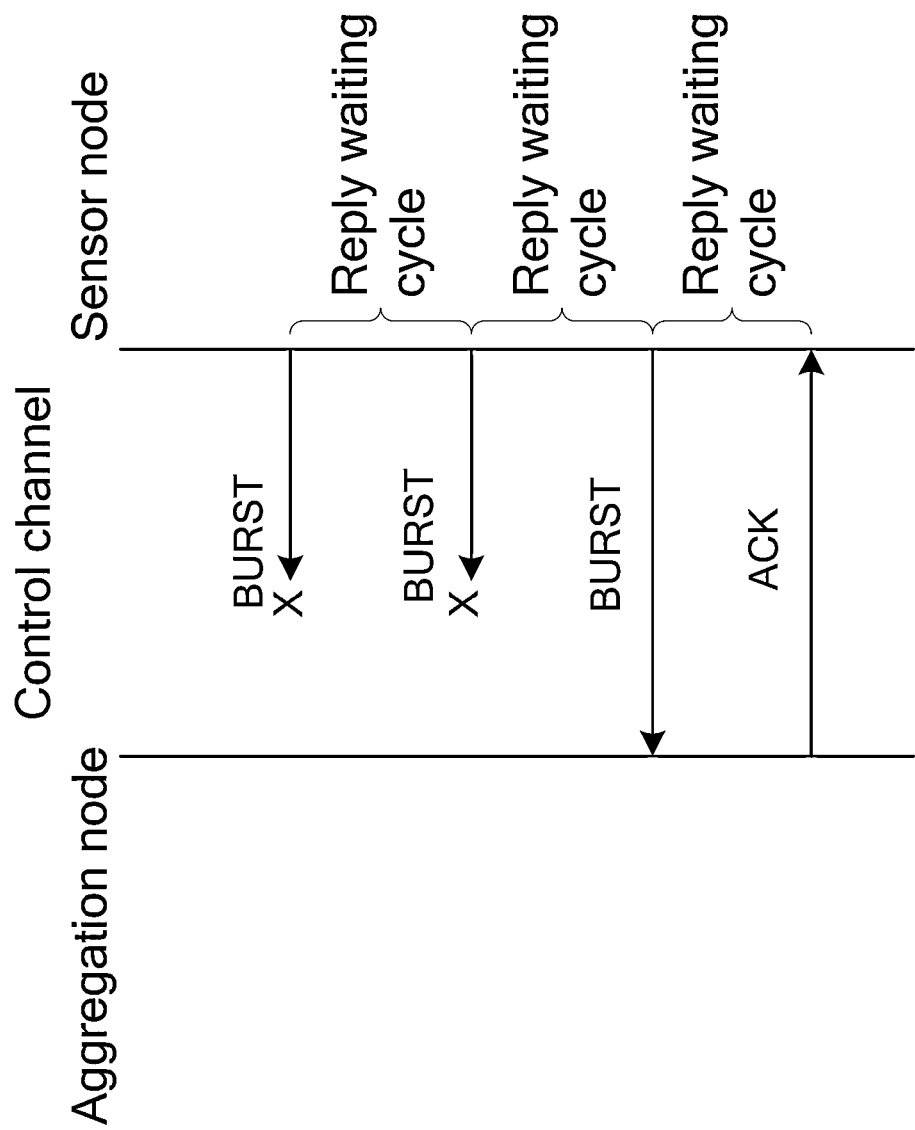
FIG. 10 shows a burst frame transmission abnormality of a sensing terminal.

Abnormal burst frame transmission by the sensing terminal means that the control channel burst frame (BURST) transmitted by the sensing terminal is not successfully received by the aggregation node due to a transmission error or a matching error. When the corresponding control channel acknowledgement frame (ACK) is not received within the reply waiting cycle (Wait_Cycle), the sensing terminal immediately retransmits the control channel burst frame (BURST), and repeats the above operations. The sensing terminal stops retransmission and enters the sleep state if the control channel acknowledgement frame (ACK) is received within a maximum quantity of retransmissions, or enters the sleep state if the control channel acknowledgement frame (ACK) is not received after the maximum quantity of retransmissions. The maximum quantity of retransmissions is 3 by default. The aggregation node is always in the reception waiting state. The aggregation replies with the control channel acknowledgement frame (BURST) if successfully receiving the control channel burst frame (BURST), as shown in FIG. 10.

Figure 11:
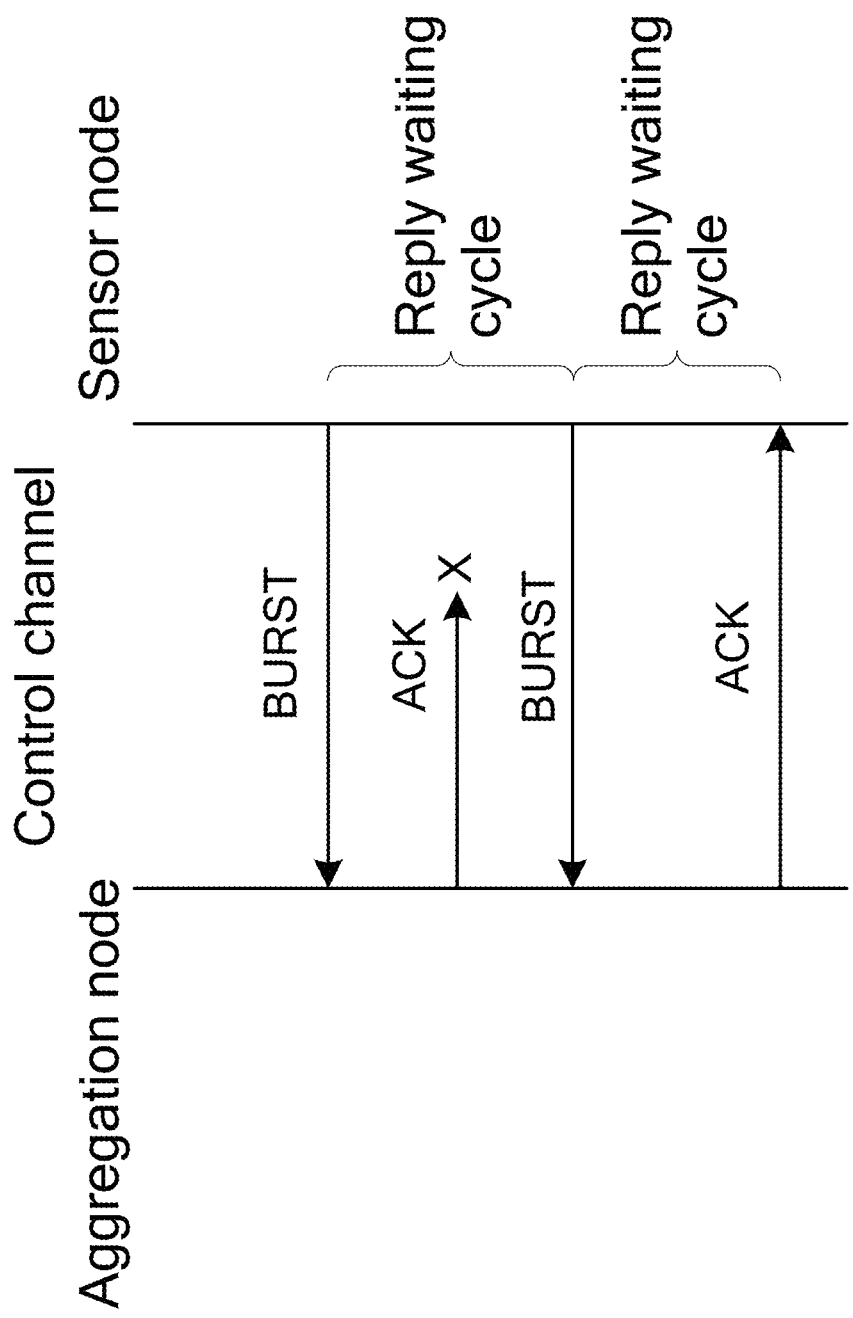
FIG. 11 shows an acknowledgement frame transmission abnormality of an aggregation node.

Abnormal acknowledgement frame transmission by the aggregation node means that the control channel acknowledgement frame (ACK) transmitted by the aggregation node is not successfully received by the sensing terminal due to a transmission error or a matching error. When the corresponding SPEND control channel acknowledgement frame (ACK) is not received within the reply waiting cycle (Wait_Cycle), the sensing terminal immediately retransmits the control channel burst frame (BURST), and repeats the above operations. The sensing terminal stops retransmission and enters the sleep state if the control channel acknowledgement frame (ACK) is received within the maximum quantity of retransmissions, or enters the sleep state if the control channel acknowledgement frame (ACK) is not received after the maximum quantity of retransmissions. The aggregation node is always in the reception waiting state, and replies with the control channel acknowledgement frame (ACK) if successfully receiving the control channel burst frame (BURST), as shown in FIG. 11.

Based on the same inventive concept, a micro-power wireless access apparatus for a sensing terminal in the Internet of things for power transmission and transformation equipment according to an embodiment of the present disclosure includes a memory, a processor, and a computer program stored in the memory and able to run on the processor, where the computer program is loaded to the processor to implement the above micro-power wireless access method applicable to a sensing terminal in the Internet of things for power transmission and transformation equipment.

Based on the same inventive concept, a micro-power wireless access apparatus for an aggregation node in the Internet of things for power transmission and transformation equipment according to an embodiment of the present disclosure includes a memory, a processor, and a computer program stored in the memory and able to run on the processor, where the computer program is loaded to the processor to implement the above micro-power wireless access method applicable to an aggregation node in the Internet of things for power transmission and transformation equipment.

Based on the same inventive concept, a micro-power wireless access apparatus for the Internet of things for power transmission and transformation equipment according to an embodiment of the present disclosure includes the micro-power wireless access apparatus for a sensing terminal in the Internet of things for power transmission and transformation equipment and the micro-power wireless access apparatus for an aggregation node in the Internet of things for power transmission and transformation equipment.

The invention claimed is:

1. A micro-power wireless access method for the Internet of things for power transmission and transformation equipment, wherein the method is applicable to a sensing terminal in the Internet of things for power transmission and transformation equipment, and comprises a time synchronization process, a traffic channel access process, a control channel configuration information access process, and a control channel burst information access process; wherein in the time synchronization process, the sensing terminal transmits a traffic channel information frame randomly, and an aggregation node determines a delay parameter based on a timeslot in which traffic information of the sensing terminal is located; and the sensing terminal transmits a control channel request frame, receives a control channel response frame that contains the delay parameter, a parameter indicating a traffic cycle length, and a parameter indicating a control cycle length and that is returned by the aggregation node, and adjusts transmission time of the traffic channel information frame and the control channel request frame based on the parameters in the received control channel response frame;

in the traffic channel access process, the sensing terminal performs one-way no-reply transmission in a fixed timeslot of a traffic channel to complete transmission of the traffic information; the sensing terminal is activated from a sleep state to monitor the traffic channel; and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time;

in the control channel configuration information access process, the sensing terminal is activated in a fixed configuration timeslot, transmits the control channel request frame to the aggregation node, and then is in a reception waiting state for a reply waiting cycle; after successfully receiving one control channel response frame each time, the sensing terminal enters a next reply waiting cycle and waits for receiving a next frame; and after successfully receiving a control channel response end frame, the sensing terminal replies with a control channel acknowledgement frame;

in the control channel burst information access process, the sensing terminal is activated when it needs to report a burst, immediately transmits a control channel burst frame on a control channel, and enters the reply waiting cycle; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit; and the traffic channel information frame, the control channel request frame, the control channel response frame, the control channel response end frame, the control channel acknowledgement frame, and the control channel burst frame are distinguished by a frame type field in a media access control (MAC) layer frame header.

2. The micro-power wireless access method for the Internet of things for power transmission and transformation equipment according to claim 1, wherein in the control channel configuration information access process, when the sensing terminal performs transmission abnormally, the sensing terminal enters the reception waiting state after transmitting the control channel request frame; and if the sensing terminal does not receive a reply within the reply waiting cycle, the sensing terminal enters the sleep state and waits, based on the control cycle length, to be activated next time; and in the control channel burst information access process, the sensing terminal immediately retransmits the control channel burst frame when the corresponding control channel acknowledgement frame is not received within the reply waiting cycle; and stops retransmission and enters the sleep state if the control channel acknowledgement frame is received within a maximum quantity of retransmissions, or enters the sleep state if the control channel acknowledgement frame is not received after the maximum quantity of retransmissions.

3. The micro-power wireless access method for the Internet of things for power transmission and transformation equipment according to claim 2, wherein the MAC layer frame header further comprises communication signaling indication, encryption indication, MAC layer load length, and sensing terminal ID fields; and for the traffic channel information frame and the control channel burst frame, a sensing terminal ID in detection data or alarm data of the sensing terminal is omitted, and only a sensing terminal ID in the MAC layer frame header is retained.

4. The micro-power wireless access method for the Internet of things for power transmission and transformation equipment according to claim 2, wherein to reduce interactions in transmission, a plurality of communication instructions are combined into a single frame and then transmitted, and data carried by a single control channel response frame or control channel response end frame cannot exceed an upper MAC load limit.

5. A micro-power wireless access apparatus for a sensing terminal in the Internet of things for power transmission and transformation equipment, comprising a memory, a processor, and a computer program stored in the memory and able to run on the processor, wherein the computer program is loaded to the processor to implement the micro-power wireless access method for the Internet of things for power transmission and transformation equipment according to claim 2.

6. The micro-power wireless access method for the Internet of things for power transmission and transformation equipment according to claim 1, wherein the MAC layer frame header further comprises communication signaling indication, encryption indication, MAC layer load length, and sensing terminal ID fields; and for the traffic channel information frame and the control channel burst frame, a sensing terminal ID in detection data or alarm data of the sensing terminal is omitted, and only a sensing terminal ID in the MAC layer frame header is retained.

7. The micro-power wireless access method for the Internet of things for power transmission and transformation equipment according to claim 1, wherein to reduce interactions in transmission, a plurality of communication instructions are combined into a single frame and then transmitted, and data carried by a single control channel response frame or control channel response end frame cannot exceed an upper MAC load limit.

8. The micro-power wireless access method for the Internet of things for power transmission and transformation equipment according to claim 1, wherein physical layer communication between the sensing terminal and the aggregation node supports LORA, BLE, and ZigBee, and a 2.4 GHz frequency band and a 470 MHz to 510 MHz frequency band are selected.

9. A micro-power wireless access apparatus for a sensing terminal in the Internet of things for power transmission and transformation equipment, comprising a memory, a processor, and a computer program stored in the memory and able to run on the processor, wherein the computer program is loaded to the processor to implement the micro-power wireless access method for the Internet of things for power transmission and transformation equipment according to claim 1.

10. A micro-power wireless access apparatus for the Internet of things for power transmission and transformation equipment, comprising the micro-power wireless access apparatus for a sensing terminal in the Internet of things for power transmission and transformation equipment according to claim 9.

11. A micro-power wireless access method for the Internet of things for power transmission and transformation equipment, wherein the method is applicable to an aggregation node in the Internet of things for power transmission and transformation equipment, and comprises a time synchronization process, a traffic channel access process, a control channel configuration information access process, and a control channel burst information access process; wherein in the time synchronization process, the aggregation node determines a delay parameter based on a timeslot in which a traffic channel information frame transmitted by a sensing terminal is located; and after receiving a control channel request frame of the sensing terminal, the aggregation node records, in a control channel response frame, the delay parameter, a parameter indicating a traffic cycle length, and a parameter indicating a control cycle length that are stored in the aggregation node, and replies to the sensing terminal with the control channel response frame;

in the traffic channel access process, the aggregation node is always in a reception waiting state; and after successfully receiving the traffic channel information frame transmitted by the sensing terminal, if an address of the sensing terminal is not in a blacklist, the aggregation node transmits the traffic channel information frame to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node;

in the control channel configuration information access process, after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; and the aggregation node enters the reception waiting state after transmitting the control channel response frame and the control channel response end frame sequentially;

in the control channel burst information access process, the aggregation node replies with a control channel acknowledgement frame if a control channel burst frame transmitted by the sensing terminal is successfully received and the address of the sensing terminal is successfully matched with the sensing terminal address in the whitelist, or continues to be in the reception waiting state if a control channel burst frame is not successfully received; and the traffic channel information frame, the control channel request frame, the control channel response frame, the control channel response end frame, the control channel acknowledgement frame, and the control channel burst frame are distinguished by a frame type field in a MAC layer frame header.

12. A micro-power wireless access apparatus for an aggregation node in the Internet of things for power transmission and transformation equipment, comprising a memory, a processor, and a computer program stored in the memory and able to run on the processor, wherein the computer program is loaded to the processor to implement the micro-power wireless access method for the Internet of things for power transmission and transformation equipment according to claim 11.

13. A micro-power wireless access apparatus for the Internet of things for power transmission and transformation equipment, comprising the micro-power wireless access apparatus for an aggregation node in the Internet of things for power transmission and transformation equipment according to claim 12.

14. The micro-power wireless access method for the Internet of things for power transmission and transformation equipment according to claim 11, wherein the MAC layer frame header further comprises communication signaling indication, encryption indication, MAC layer load length, and sensing terminal ID fields; and for the traffic channel information frame and the control channel burst frame, a sensing terminal ID in detection data or alarm data of the sensing terminal is omitted, and only a sensing terminal ID in the MAC layer frame header is retained.

15. The micro-power wireless access method for the Internet of things for power transmission and transformation equipment according to claim 11, wherein to reduce interactions in transmission, a plurality of communication instructions are combined into a single frame and then transmitted, and data carried by a single control channel response frame or control channel response end frame cannot exceed an upper MAC load limit.

16. A micro-power wireless access method for the Internet of things for power transmission and transformation equipment, comprising a time synchronization process, a traffic channel access process, a control channel configuration information access process, and a control channel burst information access process; wherein in the time synchronization process, a sensing terminal transmits a traffic channel information frame randomly, and an aggregation node determines a delay parameter based on a timeslot in which received traffic information of the sensing terminal is located; the sensing terminal transmits a control channel request frame, and after receiving the control channel request frame, the aggregation node records, in a control channel response frame, the delay parameter, a parameter indicating a traffic cycle length, and a parameter indicating a control cycle length that are stored, and replies to the sensing terminal with the control channel response frame; and the sensing terminal adjusts transmission time of the traffic channel information frame and the control channel request frame based on the parameters in the received control channel response frame;

in the traffic channel access process, the sensing terminal performs one-way no-reply transmission in a fixed timeslot of a traffic channel to complete transmission of the traffic information, the sensing terminal is activated from a sleep state to monitor the traffic channel, and if the traffic channel is busy, the sensing terminal enters the sleep state and waits, based on the traffic cycle length, to be activated next time; or if the traffic channel is idle, the sensing terminal randomly backs off for one piece of random backoff duration, transmits the traffic channel information frame to the aggregation node, enters the sleep state, and then waits, based on the traffic cycle length, to be activated next time; and the aggregation node is always in a reception waiting state, and after successfully receiving the traffic channel information frame transmitted by the sensing terminal, if an address of the sensing terminal is not in a blacklist, the aggregation node transmits the traffic channel information frame to an upper layer; if an address of the sensing terminal is in a blacklist, the aggregation node discards this frame; or if the aggregation node receives traffic information transmitted by a sensing terminal that is neither in a whitelist nor in a blacklist, the aggregation node considers the sensing terminal as a newly added sensing terminal, and then an upper layer determines whether the sensing terminal is in the blacklist or whitelist of the current aggregation node;

in the control channel configuration information access process, the sensing terminal is activated in a fixed configuration timeslot, transmits the control channel request frame to the aggregation node, and then is in the reception waiting state for a reply waiting cycle; after correctly receiving the control channel request frame transmitted by the sensing terminal, the aggregation node matches the address of the sensing terminal with a sensing terminal address in the whitelist; the aggregation node transmits the control channel response frame or a control channel response end frame to the sensing terminal if the matching is successful, or continues to be in the reception waiting state if the matching is unsuccessful; when content to be replied by the aggregation node is greater than a length of one frame, the aggregation node successively transmits a plurality of frames, and transmits the control channel response end frame in a last frame; after successfully receiving one control channel response frame each time, the sensing terminal enters a next reply waiting cycle and waits for receiving a next frame; the sensing terminal replies with a control channel acknowledgement frame after successfully receiving the control channel response end frame; and the aggregation node enters the reception waiting state after transmitting the control channel response frame and the control channel response end frame sequentially;

in the control channel burst information access process, the sensing terminal is activated when it needs to report a burst, and immediately transmits a control channel burst frame on a control channel to enter the reply waiting cycle; the aggregation node replies with the control channel acknowledgement frame if the control channel burst frame transmitted by the sensing terminal is successfully received and the address of the sensing terminal is successfully matched with the sensing terminal address in the whitelist, or continues to be in the reception waiting state if the control channel burst frame is not successfully received; and if the sensing terminal does not successfully receive the control channel acknowledgement frame, the sensing terminal uses a retransmission mechanism until the sensing terminal successfully receives the control channel acknowledgement frame or a quantity of retransmission times reaches an upper retransmission limit; and the traffic channel information frame, the control channel request frame, the control channel response frame, the control channel response end frame, the control channel acknowledgement frame, and the control channel burst frame are distinguished by a frame type field in a MAC layer frame header.

17. The micro-power wireless access method for the Internet of things for power transmission and transformation equipment according to claim 16, wherein the MAC layer frame header further comprises communication signaling indication, encryption indication, MAC layer load length, and sensing terminal ID fields; and for the traffic channel information frame and the control channel burst frame, a sensing terminal ID in detection data or alarm data of the sensing terminal is omitted, and only a sensing terminal ID in the MAC layer frame header is retained.

18. The micro-power wireless access method for the Internet of things for power transmission and transformation equipment according to claim 16, wherein to reduce interactions in transmission, a plurality of communication instructions are combined into a single frame and then transmitted, and data carried by a single control channel response frame or control channel response end frame cannot exceed an upper MAC load limit.

* * * * *